UNITED STATES PATENT OFFICE.

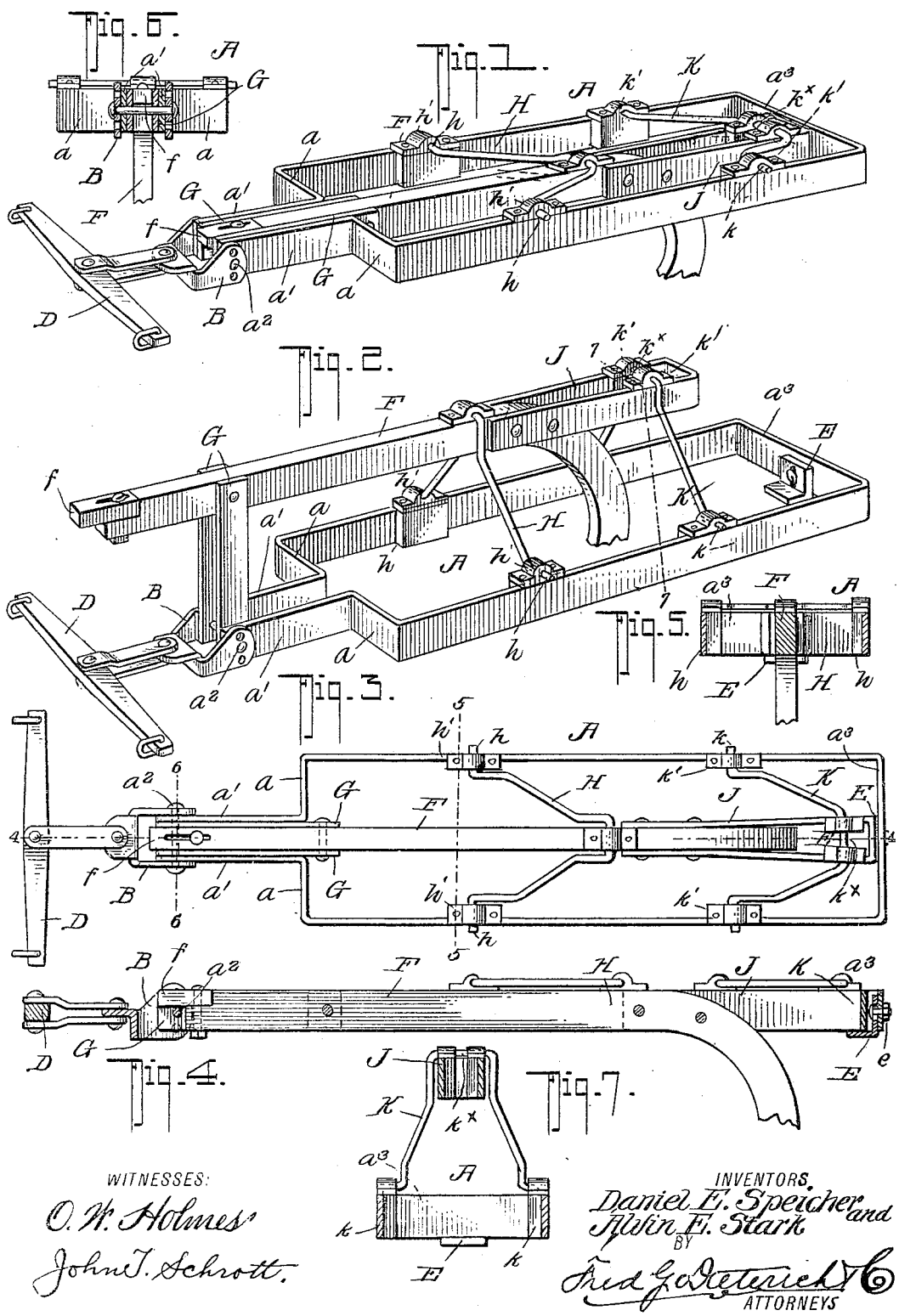

DANIEL E. SPEICHER, OF URBANA, INDIANA, AND ALVIN E. STARK, OF PLAINFIELD, ILLINOIS.

COMBINED BEAM AND FRAME PLOW-HITCH.

No. 801,411.

Specification of Letters Patent.

Patented Oct. 10, 1905.

Application filed May 31, 1905. Serial No. 263,182.

*To all whom it may concern:*

Be it known that we, DANIEL E. SPEICHER, residing at Urbana, in the county of Wabash and State of Indiana, and ALVIN E. STARK, residing at Plainfield, in the county of Will and State of Illinois, have invented a new and Improved Combined Beam and Frame Plow-Hitch, of which the following is a specification.

This invention, which generally embodies an improved construction of beam-frame hitch for single and gang riding or sulky plows designed for supporting the plow to its digging or transportable positions, more especially comprehends a solid beam and frame and hitch device combined therewith which serve as a beam-hitch when the plow is in the ground and a frame-hitch when the plow is lifted out of the soil.

Heretofore manufacturers of sulky-plows have experienced considerable difficulty in providing for a satisfactory means for applying a draft or hitch device for sulky-plows having vertical adjustment with respect to the beam. Some manufacturers have contended that a frame-hitch is the more practical, while others have held the beam-hitch as the better way of applying draft to the plow-frame.

From practical experience we have found that when either of the above means have been independently used they are open to objections and do not meet all the desired results.

Our invention, therefore, primarily seeks to overcome the objections incident in the use of hitch devices when independently arranged, as before referred to, and comprehends a special arrangement of a combined beam and frame hitch particularly designed to provide for effectively and readily raising and lowering the plow while the eveners are carried upon the frame, whereby to make it easier to raise the same than if it were carried on the beam and also to prevent the eveners from dropping on the horse's heels.

Another object of our invention is to provide for always holding the eveners in the same position (when the plow is raised or lowered) for pulling the beam when dropped into position directly from the clevis, whereby to make a solid beam-hitch for bolting the frame solidly to the clevis, and whereby to effect a direct draft and sustain the clevis always in the same position.

Furthermore, our invention seeks to provide for pulling the plow and the frame under either adjustment of the said parts direct from the hitch and for pulling both the frame and beam direct from the clevis.

With other objects in view, which will hereinafter appear, our invention consists in the peculiar coöperative arrangement and novel combination of parts, all of which will be hereinafter explained, pointed out in the appended claims, and illustrated in the accompanying drawings, in which—

Figure 1 is a perspective view of our improvement, the beam being down in position for plowing. Fig. 2 is a similar view, the beam being shown up with the plow raised out of the soil. Fig. 3 is a plan view of the parts shown in Fig. 1. Fig. 4 is a longitudinal section thereof, taken practically on the line 4 4 on Fig. 3. Fig. 5 is a cross-section taken on the line 5 5 of Fig. 3. Fig. 6 is a similar view on the line 6 6 on Fig. 3. Fig. 7 is a cross-section taken on the line 7 7 on Fig. 2.

In the practical construction our invention comprises a frame A of rectangular shape having the cross members $a$ $a$ at the front thereof extended parallelly forward, as at $a'$, to the front end of which is connected the clevis or draft-yoke B, fulcrumed on the ends of the cross-rod $a^2$, that connects the ends of the extensions $a$, as shown, and which also forms the stop or rest member that limits the downward movement of the plow-beam C.

D designates the cross-tree to which the horse-eveners in practice are attached in any well-known manner.

E designates an angle-piece adjustably secured to the rear cross portion $a^3$ of the frame A, which forms a rear stop and rest member by the bolt and nut devices $e$, (see Fig. 4,) the purpose of which will presently appear.

F designates the plow-beam of the usual shape, the front end of which is notched on its upper edge to receive an adjustable stop-piece $f$, that engages and rests upon the cross-rod $a^2$, and the plow-beam F is also connected to the cross-rod $a^2$ by the link-plates G G, fulcrumed at the front end on the cross-rod $a^2$ and pivotally connected to the beam F at some distance from its front end, as shown.

The beam F has its rear end supported on an arched yoke H, the ends of which are bent to form short pintles $h\ h$, and the said pintles are journaled in boxes $h'\ h'$, mounted on the side members of the frame A, as best shown in Figs. 1 and 2, and the rear end is further supported by a U-shaped link member J, the open end of which straddles the rear end of the said beam F and is fixedly secured to the rear end of the beam F, as shown.

K designates a second arched yoke, a duplicate of the yoke H and which has its ends $k\ k$ journaled in boxes $k'\ k'$ on the sides of the frame A, near the rear end thereof, and its upper or cross portion $k$ passes through journal-boxes on a link member J near the outer end thereof, and the said link member J and the rear end of the plow-beam have such correlative arrangement with respect to each other and the frame A that when the plow-beam is down to its lowermost position the said link J forms a rigid rearward extension of the beam F, the extremity of which engages and is supported by the stop or rest member E on the rear cross portion $a^3$ of the frame A.

By reason of the peculiar means of connecting the beam with the frame, as shown and described, the shape of the frame and the manner in which the draft-clevis is secured thereto the plow can be readily raised or lowered without disturbing the connection of the horse-eveners with the frame, thereby avoiding the dropping of the said eveners against the horse's heels when the plow is lowered. Furthermore, when the beam is dropped down it is rigidly sustained at the front and rear ends on the frame A and is held in horizontal alinement with the draft-clevis and pulled directly from the clevis, thus making a solid beam-hitch. Another advantage of our invention is that the frame being joined solidly to the clevis is pulled directly from the same, while the clevis remains in the same position under both adjustments of the beam.

The connection of the plow-beam is such that the plow can be easily raised with the beam, and when in that position the pull or draft is still directly on the frame and not on the arched and link supports that connect the beam to the frame.

By providing the front end of the beam F with an adjustable stop-piece $f$, as shown, admits of adjusting the beam so as to give it play in case conditions of the soil demand it.

Having thus described our invention, what we claim, and desire to secure by Letters Patent, is—

1. As an improvement in plow-carrying means, the following elements in combination: a rectangular frame having a bifurcated forwardly-projecting extension, a draft-clevis pivotally secured to the front end of said extension, the beam, a link connection pivotally connected at one end of the beam and at the other end to the forward bifurcated extension of the frame, an arched yoke that connects the rear end of the beam with the rectangular frame, the front end of the beam and the link connection at the said end being arranged to seat within the bifurcated extension of the rectangular frame when the beam is sprung down, and a means for sustaining the said beam at its lowermost position as set forth.

2. As an improvement in plow-carrying means, a horizontal frame, a draft-clevis connected to the front end thereof, a plow-beam held in a plane parallel with the frame and having vertical adjustment with respect to the said frame, swinging pivotal connections that join the beam and the frame, the said plow-beam having a rearwardly-projecting extension, a supplemental pivotally-swinging connection that joins the said extension with the frame and stops on the front and rear ends of the frame that form rests for the front and rear ends of the plow-beam when the latter is swung down in horizontal alinement with the rectangular frame all being arranged substantially as shown and described.

3. In a plow-carrying means of the character described, a rectangular frame having a cross member at the front end, a clevis secured to the said front end, and a stop or rest member at the rear end of the frame; of the plow-beam F, the link members G, a member that forms a part of the beam extended rearwardly therefrom, the arched yokes pivotally secured at their ends in the sides of the rectangular frame and pivotally connected to the beam and the adjustable stop $f$ secured to the beam as set forth.

4. The combination with the rectangular frame A having its front end terminated in parallel extensions, a cross-rod in the front end of the said extension, a clevis pivotally connected to said cross-rod, and the stop member connected to the rear or cross portion of the frame, the link-plates G, the U-shaped extension on the rear end of the beam, and the arched members that connect the rear end of the beam and the U-shaped extension of the beam with the frame, all being arranged substantially in the manner shown and for the purposes described.

DANIEL E. SPEICHER.
ALVIN E. STARK.

Witnesses:
ANNA M. STARK,
LEVI O. STARK.